April 11, 1961 V. H. ASKE 2,978,910
INERTIAL INSTRUMENTS
Filed April 30, 1958 3 Sheets-Sheet 1

INVENTOR.
VERNON H. ASKE
BY Roger W. Jensen
ATTORNEY

April 11, 1961  V. H. ASKE  2,978,910
INERTIAL INSTRUMENTS
Filed April 30, 1958  3 Sheets-Sheet 2

FLUX IN POLES A & B
OF SIGNAL GENERATOR

FLUX IN POLES C & D
OF SIGNAL GENERATOR

①= FLUX DUE TO PRIMARY WINDINGS 50
②= FLUX DUE TO MODULATING WINDINGS 60
③= FLUX DUE TO ① PLUS ② OR NET FLUX

INVENTOR.
VERNON H. ASKE
BY Roger W. Jensen
ATTORNEY

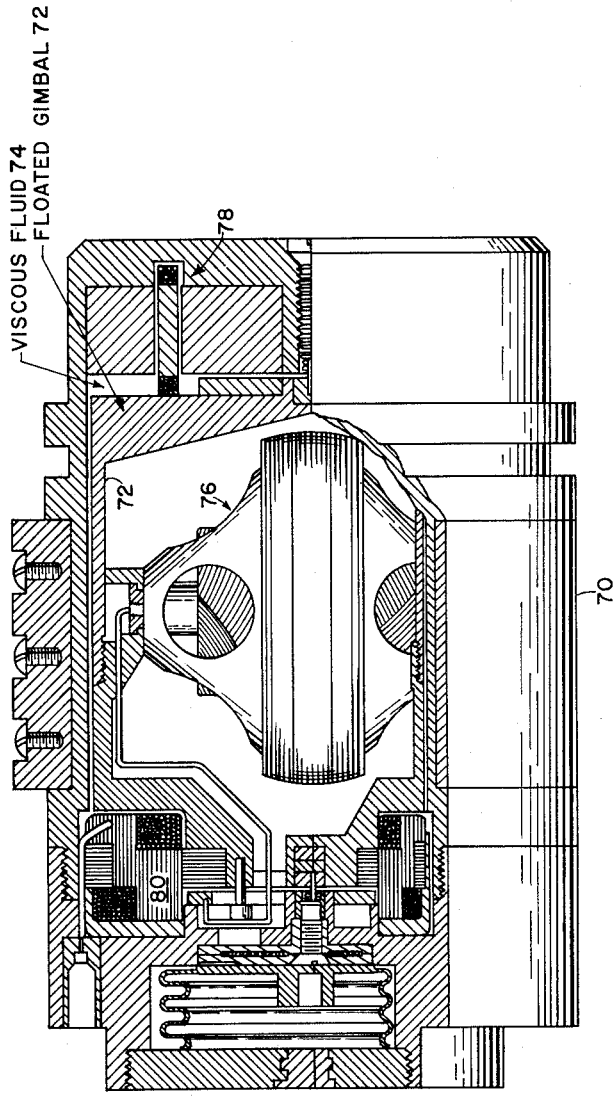

United States Patent Office

2,978,910
Patented Apr. 11, 1961

2,978,910

INERTIAL INSTRUMENTS

Vernon H. Aske, Hopkins, Minn., assignor to Minneapolis-Honeywell Regulator Company, Minneapolis, Minn., a corporation of Delaware Filed Apr. 30, 1958, Ser. No. 732,077

15 Claims. (Cl. 73—515)

This invention applies to sensitive instruments of the floated type and has special although not exclusive application to the field of floated pendulous accelerometers, floated angular accelerometers, and floated gyroscopes.

Floated instruments of the type identified are in wide spread use at the present time and generally comprise in part a housing member in which is disposed a gimbal member which is supported for rotation relative to the housing member by delicate bearing means, the bearing means usually consisting of pivots attached to the gimbal member and jewel bearings mounted in the housing. Fluid is provided in the housing which surrounds the gimbal member and has a density selected so that it matches the average density of the gimbal member. The fluid buoys up the gimbal member in substantial neutral suspension thus placing little direct loading on the delicate bearing means. The bearing means define an output or rotational axis for the gimbal member's rotation relative to the housing.

In floated instruments, the gimbal members are theoretically exactly floated by the fluid. However, as a practical matter, the degree of floatation will deviate slightly from the theoretical. Thus the gimbal member will have an average density either slightly greater than or slightly less than the density of the fluid resulting in the gimbal member being either underfloated or overfloated. This means that the cooperating pivots and jewels will have a certain amount of side loading caused by the underfloated or overfloated conditions and the side loading in turn results in additional bearing friction. The actual magnitude of the friction so produced might be considered so negligible in non-floated instruments so as to not cause any concern but in floated instruments the devices are inherently so sensitive that the friction between the pivots and jewels becomes one of the major sources of error. In floated pendulous accelerometers, for example, the bearing friction is one of the chief limitations in so far as null uncertainty and acceleration threshold is concerned.

The present invention is directed to a means for greatly reducing the amount of friction between the pivots and jewels in floated instruments. The present invention provides means in combination with a floated instrument for oscillating the floated gimbal relative to the housing about an axis which is perpendicular to the output axis of the gimbal member. The oscillatory motion of the gimbal member about this oscillation axis is very slight since there is very little clearance between the pivots and the jewels. In a typical instrument the clearance between the pivots and the jewels is in the range of between 155 and 225 micro inches. In a preferred form of the invention the oscillatory motion of the gimbal assembly relative to the housing is imparted thereto by utilizing signal generating means which serve the regular function of sensing rotation of the gimbal member relative to the housing about the output axis. A special modulating winding is added to the signal generator and energized in a manner so that oscillatory force is applied to the gimbal member at a distance away from the center of floatation thereof so as to impart an oscillatory torque to the gimbal member about an axis at right angles to the output axis.

The present invention is not to be confused with prior art attempts to reduce bearing friction by either oscillating one member relative to another about the usual rotational axis or by reciprocating one member relative to another along the usual output or rotational axis. Neither of these prior art methods of reducing bearing friction is satisfactory for the floated type of instrument. The reason for this is that they will always maintain the pivot members in contact with the bearing members and herein lies the source of friction because no matter how precisely the jewels and pivots are manufactured they still have microscopic irregularities which impose frictional restraints. With the present arrangement of oscillating an entire gimbal assembly about an axis perpendicular to the output axis, the entire floated gimbal member in effect pivots about the center of floatation thereof which, in the case of a pendulous accelerometer, is also the input axis and under steady-state operation the pivots tend to become centered relative to the jewel members and hence there is no (for all practical purposes) direct contact between the pivots and the jewels and hence the microscopic imperfections on the pivots and jewels will not impose any frictional restraint.

The present invention is also extremely useful in floated pendulous accelerometers for eliminating the side loading caused by accelerations acting on the pendulous mass. To explain, accelerations acting along the output axis of the floated pendulous accelerometer will act on the pendulous mass which is at a finite distance away from the output axis in such a way as to load the pivots against the sides of the jewels. This acceleration along the output axis can be caused either due to the physical positioning of the accelerometer (for example if the output axis was mounted vertically the force of gravity would always exert a 1 G acceleration on the pendulous mass) or due to the dynamics of the overall system in which the accelerometer is used (for example an accelerometer mounted on a dynamic device subject to extreme initial accelerations with the output axis of the accelerometer aligned or parallel with the general thrust vector of the dynamic device).

It is an object of the present invention therefore to provide an improved floated instrument.

Another object of the invention is to provide a means of reducing the friction between pivots and jewels of a floated instrument.

These and other objects of the invention will become apparent from a reading of the following specification and appended claims in conjunction with the drawings in which:

Figure 3:
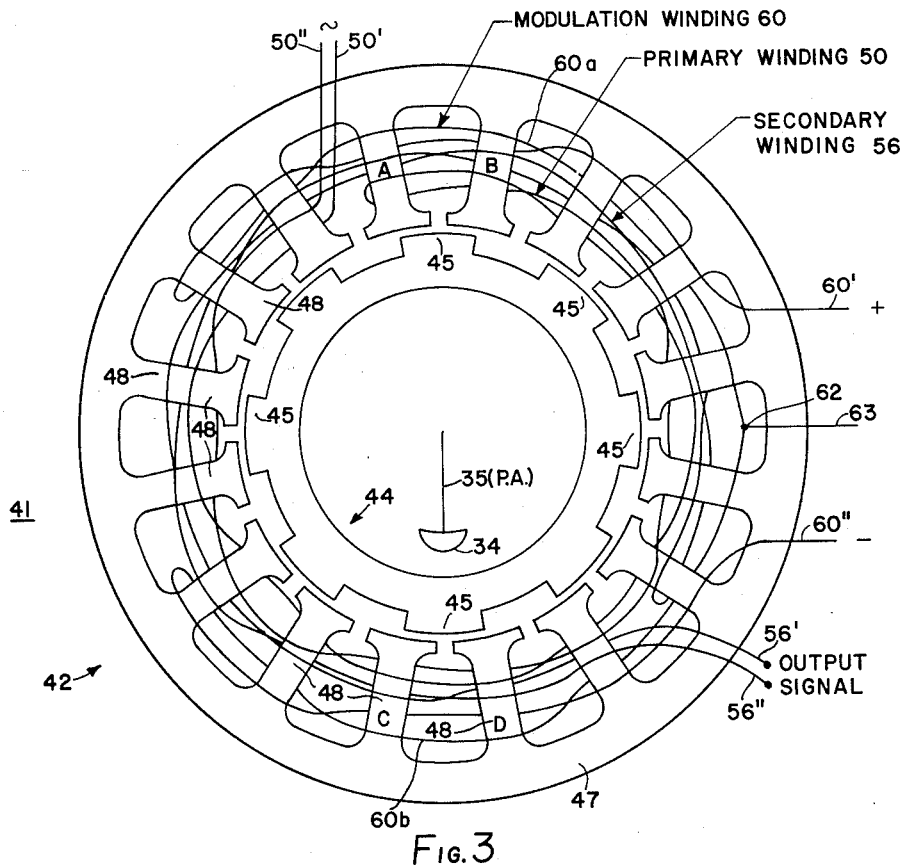
Figure 3 is a detailed view of the signal generating means and oscillating means associated with the accelerometer in Figure 1.
Figure 4:
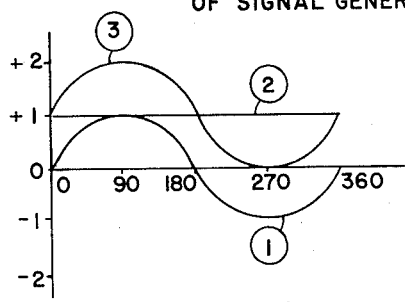
Figure 4 is a plot of the various magnetic fluxes in certain poles of the stator of the signal generating means and oscillatory means shown in Figure 3.
Figure 4A:
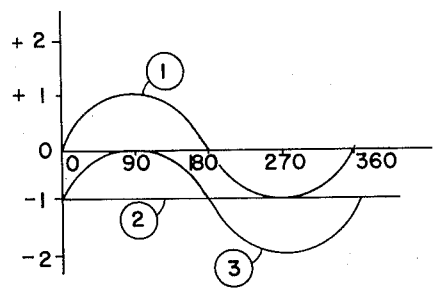

Figure 4A is an additional plot of the magnetic fluxes for certain other poles in the magnetic device shown in Figure 3; and Figure 5 is a view, partly in section, of a floated gyroscope comprising in part a magnetic device of the type shown in Figure 3 which in addition to sensing movement of the gimbal assembly about the output axis also serves to oscillate the gimbal assembly about an axis perpendicular to the output axis.

Figure 1:
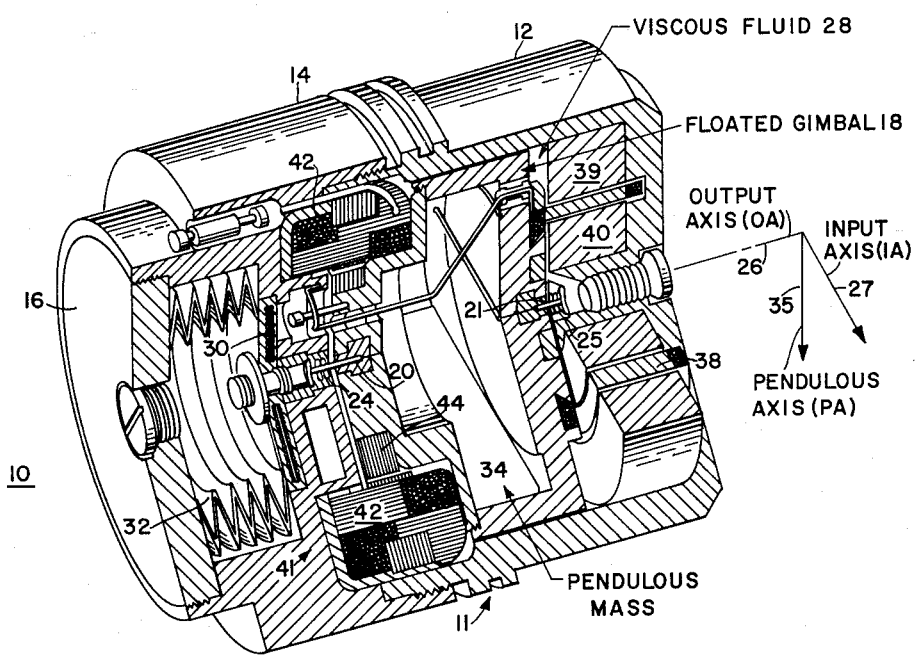
Figure 1 is an isometric view, partly in section, of a floated pendulous accelerometer incorporating the present invention.

Referring to Figure 1, a floated pendulous accelerometer 10 includes a case or housing member 11 including a cup shaped portion 12 and a cylindrical member 14, the open end of which is sealed off with a plug like end plate 16. Members 12 and 14 of the case or housing 11 are provided with cooperating threads so that the two members may be screwed together so as to define a generally hollow space within.

A gimbal member 18 is positioned within the housing and generally comprises a hollow cylindrical member having an outer diameter slightly less than the inside diameter of the housing. Pivot members 20 and 21 centrally mounted in opposite ends of the gimbal member 18 fit into jewel members 24 and 25 respectively, the jewel members being positioned centrally in opposite ends of the housing. The jewel members 24 and 25 thus define the output axis 26 for the pendulous accelerometer.

A viscous fluid 28 is disposed inside of the case or housing 11 and surrounds the entire gimbal assembly 18, fluid 28 being selected so as to have a density substantially equal to the average density of the gimbal assembly 18 so that the gimbal 18 is buoyed up in substantial neutral suspension. A heater member 30 is provided at one end of the housing if desired and is controlled by suitable thermostatic means not shown for maintaining the temperature of the viscous fluid 28 at the proper level. A bellows member 32 is provided within the left end of the housing as shown in Figure 1 and is in communication with the viscous fluid 28 in the well known fashion so as to take up any expansion or contraction of the fluid and thus prevent any bubbles from being formed within the device.

Figure 2:
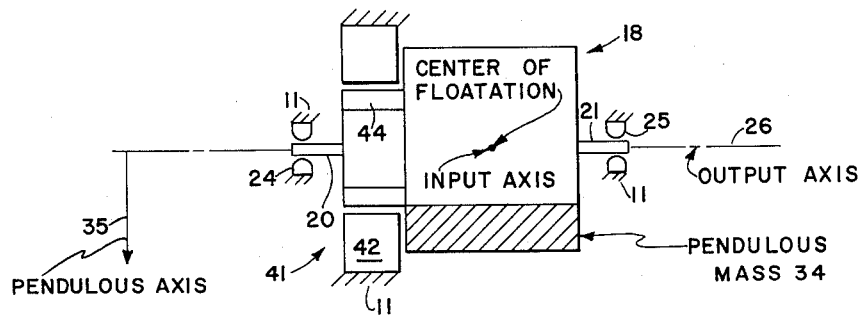
Figure 2 is the schematic representation of a portion of a floated pendulous accelerometer including the pendulous gimbal member, the pivot and jewel support which defines the output axis thereof, and the means providing for oscillating the pendulous gimbal member about the center of flotation or input axis.

The floated gimbal assembly 18 is a generally symmetrical device except for a mass portion 34 mounted in the gimbal and spaced away from the output axis defined by the bearings 24 and 25. Effectively, mass 34 can be considered to lie on a pendulous axis 35 which is perpendicular to the output axis 26. The pendulous mass 34 thus renders the gimbal assembly 18 sensitive (causes it to rotate relative to housing 11) to accelerations perpendicular to the output and pendulous axes. This sensitive axis is identified as the input axis 27 and, as shown in Figure 2, coincides with the center of flotation of the gimbal assembly 18.

Means are provided for torquing the gimbal assembly 18 about its output axis including a moving coil cup member 38 secured to the right hand side of the gimbal assembly 18 as shown in Figure 1 and a pair of annular permanent magnet members 39 and 40 mounted within the end of the cup portion 12 of the case or housing. The torque generating means form no direct part of the present invention but are disclosed since such means are usually provided in a pendulous floated accelerometer.

Means are also provided for sensing rotation of the gimbal assembly 18 relative to the case or housing. The signal generating means 41 includes a stator member 42 and a rotor or armature member 44. Both stator member 42 and rotor member 44 of the signal generating means are laminated magnetic members, the end views of which are shown in considerable detail in Figure 3. Armature or rotor member 44 is secured to the gimbal assembly 18 at the left extremity thereof as shown in Figure 1 by being mounted on a suitably shaped shoulder in the gimbal 18. Rotor member 44 has a plurality of pole portions 45 extending outward in a radial direction from the output axis.

Stator member 42 has a circular yoke portion 47 and a plurality of inwardly extending pole portions 48. It will be noted that there are twice as many pole members 48 on the stator 42 as there are poles 45 on the rotor member 44. The rotor member 44 at its normal or null position is oriented relative to the stator member so that each of the poles 45 thereon bridges the air gap between a pair of poles on the stator member 42. A primary winding 50 is provided on the stator member 42 and is shown schematically in Figure 3. The primary winding 50 is lap wound and has a pole pitch of 2. For example two of the poles 48 of the stator member 42 at the top of the drawing as shown in Figure 3 have been identified as poles A and B. It will be noted that the primary winding 50 loops both poles A and B and then progressing clockwise from that point around the stator member 42 it will be noted that alternate pairs of poles 48 have the primary winding encircling them in an alternate fashion. Thus the instantaneous flux produced by the action of the primary winding 50 will be opposite for alternate pairs of poles. The two ends of the primary winding 50 identified by reference numerals 50' and 50" are energized by a suitable source of alternating current.

A secondary winding 56 is also provided and is shown schematically in Figure 3. Secondary winding also has a pole pitch of 2 similar to the primary winding 50 but the secondary winding is rotated one pole width from the primary winding. The two ends of the secondary winding 56 are identified by reference numerals 56' and 56" and serves as a means of connecting the output signal from a signal generator to the desired load device. The signal so generated may, in one application, be amplified, demodulated, and applied to the moving coil portion 38 of the torque generator so as to tend to return the gimbal assembly 18 to its null position. It will be appreciated that when the rotor member 44 is at its null position with respect to the stator member 42, this null position being shown in Figure 3, there will be zero net signal induced in the secondary winding 56. However, when there is relative rotation in one sense or the other between the rotor 44 and the stator 42 corresponding to the gimbal assembly 18 rotating relative to the case or housing of the accelerometer, then there will be a net alternating voltage of one phase or the other developed in the secondary winding 56. The magnitude of the generate voltage will be a function of the amount of relative rotation between the two members of the signal generator.

A modulating winding 60 is also provided on the stator member 42. It includes an upper section 60a and a lower section 60b as shown in Figure 3. The upper section 60a encircles three sets of pole pairs on one side of stator 42, the center set of poles being identified as A and B. The lower section 60b encircles three sets of pole pairs on the opposite side of stator 42, the center set of this group of poles being identified as C and D. Pole pair A and B and pole pair C and D define a centerline which is common to the pendulous axis 35. The modulating winding 60 encircles the same pole pairs as the primary winding 50 but the winding sense of portions 60a and 60b are reversed so that the alternating currents induced therein by primary current are out of phase with one another and cancel out so no alternating voltage appears at the output terminals of the modulating winding, said terminals being identified by reference numerals 60' and 60".

Direct current from a suitable source is applied to the terminals 60' and 60" and the effect of this may be explained by reference to Figures 4 and 4A which shows an instantaneous flux plot for the flux in poles A and B and in the poles C and D of the stator member 42. The flux produced in poles A and B as a result of the primary windings 50 is identified as flux 1. The flux emanating from poles C and D is shown in Figure 4A and there the flux due to the primary windings is also identified as flux 1. It will be noted that flux 1 or the flux due to the primary windings is identical in poles A and B with that in poles C and D. This is due to the arrangement of the primary winding 50. The flux produced by the modulating winding 60 is identified in Figures 4 and 4A as flux 2. Due to the manner of winding the modulating winding it will be noted that the flux in poles A and B as shown in Figure 4 has a positive sense while the flux produced by the modulating windings in poles C and D as shown in Figure 4A has a negative sense. Thus the flux produced by the modulating winding will operate in a differential manner with respect to the flux produced by the primary winding 50. This is shown graphically in Figures 4 and 4A wherein flux 3 is the net flux or summation of the primary flux 1 and the modulating flux 2. It will be noted that flux 3 in Figure 4 which represents the flux in poles A and B at the 90° point has a net value of plus 2 while the flux in poles C and D at the same instant has a value of zero. This means that there is a flux unbalance at this instant between the rotor 44 and stator 42 of the magnetic pickoff which tends to develop a force acting on the armature member 44 perpendicular to the output axis thereof. This force is applied to the armature 44 and to the floated gimbal assembly 18 since the armature is connected thereto a finite distance away from the center of flotation of the gimbal assembly. The center of floatation serves as a pivot point about which the forces developed by the magnetic devices 42, 44 may act. From an inspection of Figures 4 and 4A it will be appreciated that the flux unbalance shifts in sense as the primary flux varies. For example, at $T=90$ there is a net flux of plus 2 units in poles A and B while there is a zero net flux in poles C and D. Later, at $T=270$ there is a net flux of zero in poles A and B and a minus 2 units of flux in the poles C and D. Thus it will be appreciated that the force produced by the magnetic device is oscillatory in nature.

The modulating winding 60 is tapped at 62 and connected thereto is a lead 63 which may be used in combination with leads 60' and 60" for measuring purposes.

The action of the oscillatory force producing means may be better appreciated by reference to Figure 2 wherein the clearance between the pivots 20 and 21 and the jewels 24 and 25 has been exaggerated. As pointed out above this clearance for one application was in the range of 155 to 225 micro inches. The combination signal generator and force producing means 41 is somewhat diagrammatically shown. It may be assumed for purposes of example that the unit shown in Figure 2 is slightly underfloated or, in other words, the density of the gimbal assembly 18 is slightly greater than the density of the viscous fluid 28. Thus the device initially will be resting with the pivots 20 and 21 bearing against the lower or bottom surface of the bearings 24 and 25. Then, assume that the combination signal generating and torque or force producing means 41 is energized. In other words both the primary winding 50 and the modulating winding 60 are energized respectively by alternating currents and direct currents. The initial upward force developed by the force producing means 41 will act on the left end of gimbal assembly 18 and tend to cause it to pivot clockwise as shown in Figure 2, the pivot 21 serving as a fulcrum for this initial rotation. Then, on the next half-cycle when the force is reversed, the gimbal assembly 18 will be rotated counterclockwise as shown in Figure 2. The pivoting occurs at the center of flotation and pivot 20 is moved down toward the bottom of jewel 24 and pivot 21 is moved up toward the top of jewel 25 but before contact between the pivots and jewels is made the force is reversed again. The average steady-state position of the gimbal assembly when it is being so oscillated is with the pivots 20 and 21 being generally centered in the apertures of bearings 24 and 25 and out of contact therewith, the pivoting occurring about the center of flotation.

The theory of operation for the example of an overfloated gimbal is similar for the steady state case, the only difference being in the initial cycle. The overfloated gimbal at rest would tend to have the top surface of the pivots 20 and 21 as shown in Figure 2 bearing against the top of the bearings 24 and 25 respectively. After the primary and modulating windings of device 41 are energized, the first downward force would tend to pivot the gimbal assembly counterclockwise as shown in Figure 2, the fulcrum or pivot point being at pivot 21. Thus pivot 20 would be moved down and away from jewel 24. Then, on the next half-cycle when the force is reversed, the gimbal is rotated counterclockwise pivoting about the center of flotation and causing pivot 21 to be displaced away from its contact with jewel 25. Thereafter, the gimbal would have an average steady-state position where the pivots were centered in the jewels.

As long as the force producing means 41 remain energized, the oscillatory motion imparted to the gimbal assembly will tend to keep both of the pivots 20 and 21 more or less centered relative to the jewels 24 and 25 respectively, the oscillatory force applied to the end of the gimbal assembly 18 effectively pivoting the gimbal assembly about its center of flotation. By this means the pivots 20 and 21 are contacting the jewels 24 and 25 much less than would be the case if no force producing means were involved and accordingly the frictional restraints of the cooperating pivots and jewels is materially reduced.

The reduction in friction between the pivots and jewels lowers both the null uncertainty and threshold of the device. The null uncertainty of a floated pendulous accelerometer is a figure of merit. The gimbal is first rotated in one direction about the OA to one extreme (usually defined by stop means, not shown) and then allowed to be returned toward the null position by the action of the pendulous mass 34. Before the gimbal returns to the null position, it will stop due to friction at a position $P_1$, angularly displaced from the true null position. Then the gimbal is rotated in the opposite sense about the OA to the other extreme and again allowed to return, the new return point being identified as $P_2$. Points $P_1$ and $P_2$ will be on opposite sides of the true null position and it follows that the greater the friction between the pivots and jewels, the greater will be the null uncertainty or angular separation of points $P_1$ and $P_2$. One example which illustrates the merit of the present invention is a floated pendulous accelerometer which had a null uncertainty of the range of 6 to 10 minutes of arc. After the present invention was incorporated into the device the null uncertainty was reduced to the range of 6 to 10 seconds of arc, an improvement by a factor of 60. The threshold, or level of acceleration to which the accelerometer will respond, is also markedly improved by the present invention.

In Figure 3, the pendulous mass 34 and pendulous axis 35 are shown schematically relative to combination pickoff and oscillatory force producing means 41. The pendulous axis 35 is aligned with the diametral line dividing poles AC and BD so that the force developed by device 41 is all transmitted to the gimbal assembly in a plane which includes the pendulous axis 35 and the output axis 26. This is done so that the gimbal assembly is oscillated about the input axis only. Further and of greater importance, the development of force by means 41 in the plane defined by the OA 26 and PA 35 overcomes forces on the gimbal assembly due to acceleration along the OA.

Figure 5 shows a floated gyroscope in which the present invention has been applied. In many respects the floated gyro is similar to the floated pendulous accelerometer shown in Figure 1 in that it has a housing 70 in which is positioned a floated gimbal member 72 and is positioned for rotation about an output axis by jewels and pivots. A viscous fluid 74 surrounds the floated gimbal assembly 72 and supports it in substantial neutral suspension. A gyro spin motor assembly 76 is contained within the floated gimbal 72 instead of the pendulous mass 34 of the accelerometer shown in Figure 1. The torque generating means 78 is provided at the right hand end of the gyro as shown in Figure 5 and a combination signal generating means and lateral force producing means 80 is provided near the left end of the gimbal assembly 72 as shown in Figure 5. The combination signal generating means and force producing means 80 in the gyro shown in Figure 5 from a functional standpoint is identical to unit 41 described in connection with the floated pendulous accelerometer shown in Figure 1.

The principle of operation of the force producing means 80 with the floated gyro shown in Figure 5 is the same as the theory of operation of force producing means 41 with the floated pendulous accelerometer unit shown in Figure 1. The friction between the pivots and jewels is greatly reduced by the present invention and serves to greatly increase the accuracy of the device since a substantial source of error has been removed.

Although a floated angular accelerometer has not been shown, it will be appreciated that the present invention may be applied to this type of device as well as other floated instruments.

Since, in all floated instruments, there must be clearance between the pivots and jewels, the radial movement of the gimbal within the clearance can cause variation of fixed torques. For example, the reaction torque of the signal generator is a function of radial position. Undefined movements within this clearance can cause uncertainties in this floated instrument. By oscillating the pivot radially within the jewel, these torques average out and reduce this uncertainty.

While the lateral force producing means has been shown combined with the signal generating means, it will be appreciated that the two functions can be separated and provided by separate and distinct means. Further, it will be appreciated the invention contemplates a wide variation in the mechanization of the lateral force producing means. Therefore, while I have shown and described a specific embodiment of this invention, further modifications and improvements will occur to those skilled in the art. I desire to be understood, therefore, that this invention is not to be limited to the particular form shown and I intend in the appended claims to cover all modifications which do not depart from the spirit and scope of this invention.

What I claim is:

1. In apparatus of the class described, a housing; a pair of spaced apart bearing means in said housing having circular apertures, said bearing means defining an output rotational axis; a pendulous chamber member positioned within said housing; circular pivot means on said pendulous chamber member adapted to be positioned within said apertures of said bearing means, said apertures being larger than said pivot means so that a small transverse shifting of said pivot means in said apertures is permitted; viscous fluid disposed in said housing so as to surround said pendulous chamber member and having a density substantially equal to the average density of said pendulous chamber member thus substantially neutrally suspending said pendulous chamber member; and means for applying an oscillatory rotational torque to said pendulous chamber member about an axis perpendicular to said output rotational axis and in a plane which includes the pendulous axis of said pendulous chamber member, said torque applying means including coacting means positioned in part on said housing and in part on said pendulous chamber member.

2. In apparatus of the class described, a housing; a pair of spaced apart bearing means in said housing having circular apertures, said bearing means defining an output rotational axis; a pendulous chamber member positioned within said housing; circular pivot means on said pendulous chamber member adapted to be positioned within said apertures of said bearing means, said apertures being larger than said pivot means so that a small transverse shifting of said pivot means in said apertures is permitted; viscous fluid disposed in said housing so as to surround said pendulous chamber member and having a density substantially equal to the average density of said pendulous chamber member thus substantially neutrally suspending said pendulous chamber member; signal generating means for producing a signal as a function of relative rotation between said pendulous chamber member and said housing, said signal generating means including means on said housing and means on said pendulous chamber member; and means associated with said signal generating means for applying an oscillatory rotational torque to said pendulous chamber member about an axis perpendicular to said output rotational axis and in a plane which includes the pendulous axis of said pendulous chamber member.

3. In apparatus of the class described, a housing; a pair of spaced apart bearing means in said housing defining an output rotational axis, each of said bearing means having an aperture; a pendulous chamber member positioned within said housing; pivot means on said pendulous chamber member adapted to be positioned within said apertures of said bearing means, said apertures being larger than said pivot means so that a small transverse shifting of said pivot means in said apertures is permitted; fluid disposed in said housing so as to surround said pendulous chamber member; and means for applying an oscillatory rotational torque to said pendulous chamber about an axis perpendicular to said output rotational axis and in a plane which includes the pendulous axis of said pendulous chamber member.

4. Inertial apparatus of the class described comprising a housing; a pair of jewel bearing members mounted in said housing and defining an output axis; a hollow hermetically sealed gimbal member positioned within said housing and including a pair of pivot members adapted to be fitted within said pair of jewel bearing members so that said gimbal member is supported for rotation about said output axis, said pivot members being slightly smaller than said jewel bearing members; fluid means in said housing and surrounding said gimbal member, said fluid means having a density selected so that said gimbal member is substantially neutrally suspended therein; and means on said housing and said gimbal member for applying an oscillatory force to said gimbal member, said force having a competent perpendicular to said output axis and being applied a finite distance away from the center of flotation of said gimbal member, the application of said force causing said gimbal member to oscillate about an axis normal to said output axis.

5. Inertial apparatus of the class described comprising a housing; a pair of jewel bearing members mounted in said housing and defining an output axis; a hollow hermetically sealed gimbal member positioned within said housing and including a pair of pivot members adapted to be fitted within said pair of jewel bearing members so that said gimbal member is supported for rotation about said output axis, said pivot members being slightly smaller than said jewel bearing members; fluid means in said housing and surrounding said gimbal member, said fluid means having a density selected so that said gimbal member is substantially neutrally suspended therein; and electromagnetic means including a stator member on said housing, an armature member on said gimbal assembly, and energizable means which when energized causes said armature member to be radially displaced relative to said stator member in an oscillatory manner, said radial oscillatory displacement of said armature causing said gimbal member to be oscillated about an axis perpendicular to said output axis.

6. Inertial apparatus of the class described comprising a housing; a pair of jewel bearing members mounted in said housing and defining an output axis; a gimbal member positioned within said housing and including a pair of pivot members adapted to be fitted within said pair of jewel bearing members so that said gimbal member is supported for rotation about said output axis, said pivot members being slightly smaller than said jewel bearing members; fluid means in said housing and surrounding said gimbal member, said fluid means having a density selected so that said gimbal member is substantially neutrally suspended therein; and magnetic means including first means on said housing, second means on said gimbal assembly, and energizable means on one of said magnetic means which when energized causes said second means to be radially displaced relative to said first means in an oscillatory manner.

7. In a floated instrument: a housing; a gimbal member positioned in said housing; means for rotatably supporting said gimbal member for rotation about an output axis relative to said housing including relatively loosely fitting bearing means and pivot means connected to said housing and said gimbal member; viscous fluid means in said housing surrounding said gimbal member; and means for oscillating said gimbal member about an axis perpendicular to said output axis, said oscillating means including coacting means on said housing and on said gimbal member.

8. In a floated instrument: a housing; a gimbal member positioned in said housing; pivot means and bearing means connected to said housing and said gimbal member for rotatably supporting said gimbal member for rotation about an output axis relative to said housing, said pivot means and said bearing means having a transverse clearance therebetween; fluid means in said housing surrounding said gimbal member; and means for oscillating said gimbal member about an axis perpendicular to said output axis, said oscillating means including coacting means on said housing and on said gimbal member.

9. In a floated instrument: a housing; a gimbal member; means connected to said housing and said gimbal member for supporting said gimbal member in said housing for rotation about an output axis including relatively loosely fitting bearing means and pivot means; viscous fluid means in said housing surrounding said gimbal member and supporting said gimbal member in substantial neutral suspension; and means for oscillating said gimbal member so that said pivot means are shifted in said bearing means transverse to said output axis, said oscillating means including coacting means on said housing and on said gimbal member.

10. In a floated pendulous accelerometer: a housing; a pendulous gimbal member positioned in said housing and rotatably supported for rotation about an output axis relative to said housing by bearing means connected to said housing and to said gimbal member, said bearing means being characterized by permitting limited rotation between said housing and said gimbal members about an axis perpendicular to said output axis, and said gimbal member responding to acceleration along an input axis perpendicular to said output axis; signal generating means including means on said gimbal member and means on said housing for producing a signal as a function of relative rotation about said output axis between said gimbal member and said housing; means associated with said signal generating means for oscillating said pendulous gimbal member about said input axis; and fluid means in said housing and around said pendulous gimbal member.

11. In a floated pendulous accelerometer: a housing; a pendulous gimbal member positioned in said housing and rotatably supported for rotation about an output axis relative to said housing by bearing means connected to said housing and pivot means connected to said gimbal member, said bearing means and said pivot means being characterized by permitting limited rotation between said housing and said gimbal member about an axis perpendicular to said output axis, and said gimbal member responding to acceleration along an input axis perpendicular to said output axis; fluid means in said housing supporting said pendulous gimbal member in substantial neutral suspension; and magnetic means for oscillating said pendulous gimbal member about said input axis.

12. In a floated pendulous accelerometer: a housing; a pendulous gimbal member positioned in said housing and rotatably supported for rotation about an output axis relative to said housing by bearing means connected to said housing and pivot means connected to said gimbal member, said bearing means and said pivot means having a transverse clearance therebetween, and said gimbal member responding to acceleration along an input axis perpendicular to said output axis; means for oscillating said pendulous gimbal member relative to said housing so that said pivots are shifted transversely in said bearing means in a direction perpendicular to said output axis; and fluid means in said housing and around said pendulous gimbal member.

13. In a floated pendulous accelerometer: a housing; a pendulous gimbal member positioned in said housing and rotatably supported for rotation about an output axis relative to said housing by pivot means and bearing means connected to said housing and to said gimbal member, said bearing means and said pivot means having a transverse clearance therebetween, and said gimbal member responding to acceleration along an input axis perpendicular to said output axis; means for oscillating said pendulous gimbal member about said input axis; and fluid means in said housing and around said pendulous gimbal member.

14. In a floated gyroscope: a housing; a gimbal member positioned in said housing; a gyroscope mounted in said gimbal member; means for rotatably supporting said gimbal member for rotation about an output axis relative to said housing including bearing means and pivot means, said bearing means and pivot means having a transverse clearance therebetween; viscous fluid means in said housing surrounding said gimbal member; and means for oscillating said gimbal member relative to said housing about an axis perpendicular to said output axis, said oscillating means including coacting means on said housing and on said gimbal member.

15. In apparatus of the class described, a housing member; a chamber member positioned within said housing member; a pair of spaced apart bearing means on one of said members defining an output rotational axis; pivot means on the other of said members adapted to be positioned within said bearing means, said bearing means and said pivot means having a radial clearance therebetween; fluid means in said housing surrounding said chamber member; and means connected to said members for applying an oscillatory torque to said chamber member about an axis perpendicular to said output rotational axis.

References Cited in the file of this patent
UNITED STATES PATENTS

| | | |
|---|---|---|
| 1,512,804 | Roucka | Oct. 21, 1924 |
| 1,589,039 | Anschutz-Kaempfe | June 15, 1926 |
| 2,618,159 | Johnson et al. | Nov. 18, 1952 |
| 2,809,526 | Lundberg | Oct. 15, 1957 |
| 2,816,748 | Woestemeyer | Dec. 17, 1957 |
| 2,853,287 | Draper et al. | Sept. 23, 1958 |
| 2,856,239 | Dacus | Oct. 14, 1958 |
| 2,900,602 | Stettler | Aug. 18, 1959 |